United States Patent [19]
Jackson

[11] 3,759,311
[45] Sept. 18, 1973

[54] ARC SLAG MELTING
[75] Inventor: Harold S. Jackson, Troy, N.Y.
[73] Assignee: Allegheny Ludlum Steel Corporation, Pittsburgh, Pa.
[22] Filed: Apr. 4, 1972
[21] Appl. No.: 241,082

Related U.S. Application Data
[63] Continuation of Ser. No. 854,144, Aug. 29, 1969, abandoned.

[52] U.S. Cl. .............................. 164/52, 13/9, 75/10, 75/11, 75/94
[51] Int. Cl. ..... B22d 27/02, H05b 7/18, C22b 9/10, C22d 7/00
[58] Field of Search ................. 75/10, 11, 12; 13/9; 164/52

[56] References Cited
UNITED STATES PATENTS

| | | | |
|---|---|---|---|
| 3,271,828 | 9/1966 | Shelton | 75/10 |
| 3,347,766 | 10/1967 | Death | 75/10 |
| 3,469,968 | 9/1969 | Snow | 75/10 |
| 3,354,254 | 11/1967 | Jackson | 13/9 |
| 807,034 | 12/1905 | von Kugelgen | 75/12 |
| 3,203,883 | 8/1965 | Ototani | 75/10 |
| 3,496,280 | 2/1970 | Dukelow | 13/9 |

OTHER PUBLICATIONS
Electroslag Refining in the U.K., pp. 92–95 (Steel Times, 7/15/1966).
The Electroslag Process, pp. 44–47 (Metals, 3/1967).

Primary Examiner—L. Dewayne Rutledge
Assistant Examiner—Peter D. Rosenberg
Attorney—Vincent G. Gioia

[57] ABSTRACT

The method of consumable electrode casting an alloyed metal ingot by electro-slag refining to produce a high quality homogenous ingot wherein a layer of molten slag in the furnace separates the electrode from the molten pool formed thereunder. The electrode is lowered into the slag layer and electrical current is flowed substantially through the electrode and the slag and subsequently, is withdrawn from the slag sufficiently to establish an electric arc between the electrode and the top of the slag whereby the electrode is melted by the heat of the arc and the slag thereunder, to form droplets of electrode metal which migrate from the electrode through the slag layer and accumulate in a pool of molten metal thereunder. The molten pool is continually solidified at a predetermined rate to form the high quality homogenous ingot.

6 Claims, 2 Drawing Figures

INVENTOR.
HAROLD S. JACKSON

ARC SLAG MELTING

This application is a continuation of Ser. No. 854,144, filed Aug. 29, 1969, and now abandoned.

BACKGROUND OF THE INVENTION

Consumable arc melting furnaces are well known and comprise an electrode of metal to be melted that extends downwardly into a mold or crucible which receives the molten metal and wherein an ingot is formed by solidification of the metal. The electrode may be connected to one terminal on the voltage source and means may be provided for electrically connecting the other terminal of the source to the mold. In the case of multi-electrode furnaces, the electrode circuit may be closed through the mold or another electrode. Usually, in starting a melt in a consumable electrode furnace, a small supply of starter metal is placed in the mold either in the form of chips or a molten charge so that when the current is established the arc will not be struck directly to the mold walls. In the conventional consumable electrode melting furnace the electric current is then maintained directly between the electrode to be melted and the molten pool beneath it by an electric arc struck therebetween. The end of the electrode is melted due to the heat of the arc existing thereunder, and as the electrode is melted, it is deposited in the mold and forms the aforesaid molten pool. The bottom portion of the pool continuously solidifies to form an ingot which increases in length from the bottom of the mold upwardly. By this process, impurities float to and on top of the molten pool and, assuming that the pool does not solidify too quickly during the formation of the ingot, the major portion of the impurities will be excluded from the main body thereof.

In conventional electro-slag melting, a molten electrically conductive slag layer is established on top of the pool of molten metal which is forming into an ingot. This slag layer is conventionally established by placing slag material in the crucible in either granular form to be melted or as a molten charge to provide a conductor to which the current is passed. In conventional electro-slag melting and unlike conventional consumable electrode arc melting, the electrode is submerged within the slag layer and the melting current is maintained through the electrode, the slag layer and molten pool and, for the single electrode furnace, closed to the crucible. Electro-slag melting may be accomplished in a multi-electrode furnace with the melting current being passed through the electrodes and the slag layer and may be closed either through the molten pool to the crucible, or in the case of alternating currents through the companion electrodes or the crucible. In conventional electro-slag melting the electrode is melted by causing the slag layer in which the electrode is submerged to be heated by joule heating to a temperature above the melting point of the electrode metal which in turn causes the electrode to melt off in droplets that migrate through the slag layer to form a molten pool thereunder. I have discovered that the rate of melting of the electrode for electro-slag melting may be increased over that previously experienced, while still maintaining the quality of the ingot formed by departing from the teachings of conventional electro-slag melting and consumable electrode arc melting.

SUMMARY OF THE INVENTION

In a consumable electrode furnace, a method of melting the electrode and casting an alloyed metal ingot under a slag layer which comprises flowing an electrical current substantially through the electrode and slag layer, establishing an electric arc between the electrode and the top of the slag, melting the electrode by the heat generated in the electrical arc and radiated from the slag layer forming droplets of electrode metal which migrate from the electrode through the slag layer accumulating in a molten pool of metal thereunder, and solidifying the molten pool at a predetermined rate to form the alloyed ingot.

DESCRIPTION OF THE PREFERRED EMBODIMENT

Figure 1:
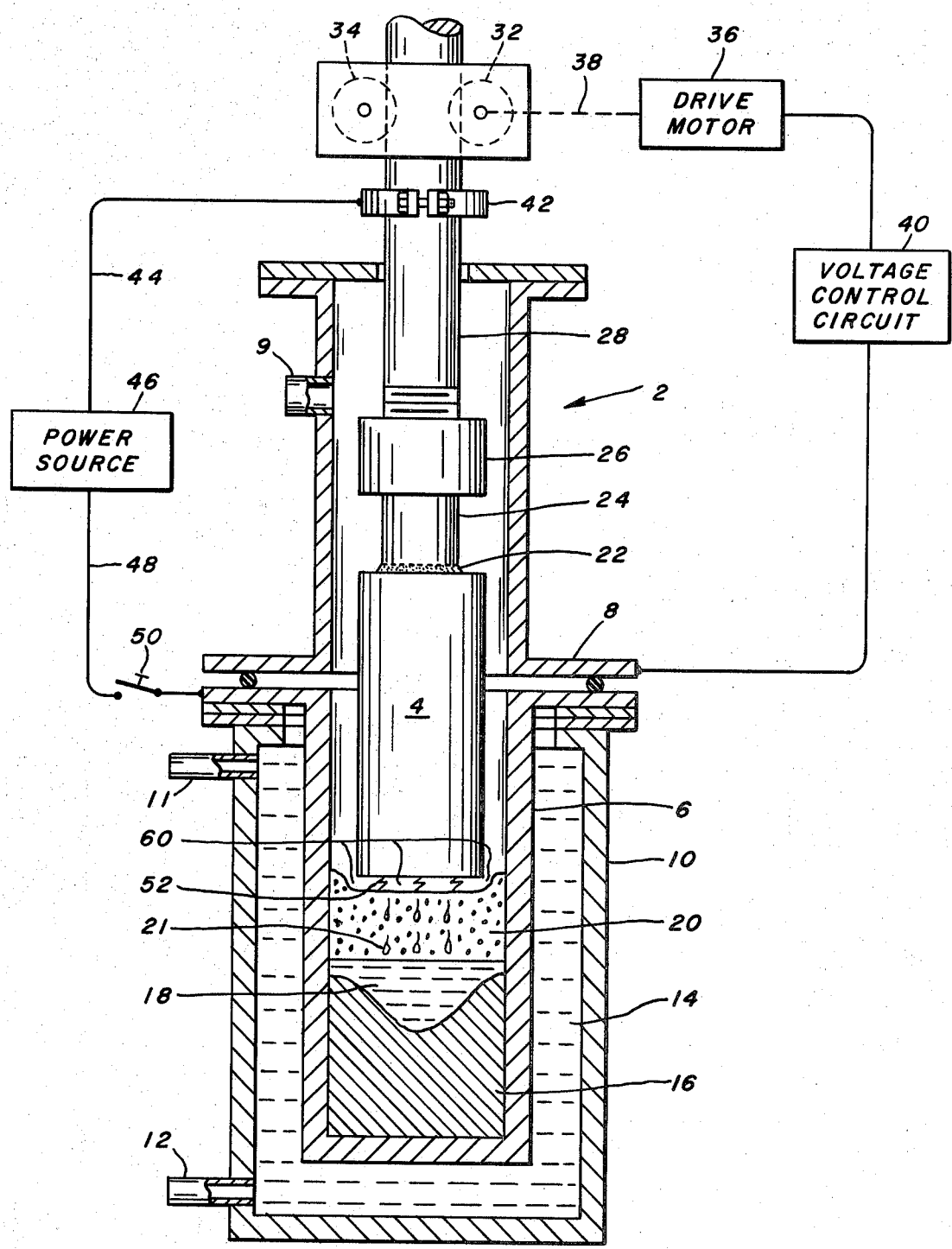
FIG. 1 is a sectional view of a consumable electrode furnace within which my invention may be practiced.

Referring now to the drawings and FIG. 1 in particular, reference numeral 2 indicates a consumable electrode furnace which has a single electrode 4 and a mold or crucible 6 which for example, may be of copper. As is known in the art, furnace 2 may also accommodate a plurality of electrodes. A housing 8 may cover the open end of the crucible and be vented by exhaust port 9. Conventionally, surrounding mold 6 is a water jacket 10 secured thereto by known means, not shown. Water jacket 10 has inlet ports 11 and outlet ports 12, connected thereto for the circulation of cooling water 14 within the jacket 10.

Mold 6 contains ingot 16 which solidifies from a molten pool 18 covered by a molten slag layer 20. Pool 18 is maintained by droplets 21 from electrode 4 of the metal to be melted. Electrode 4 may be welded as at 22 to a stub shaft 24, which in turn is secured by means of an electrode clamp 26 to the lower end of a vertically reciprocal ram 28. A variety of electrode clamps 26 may be utilized in accordance with the invention, however, one illustrative type is shown in U.S. Pat. No. 3,046,319. Ram 28 may be reciprocated by one of a number of different known mechanical drives, such as hour glass rolls 32 and 34; roll 32 being connected to a drive motor 36 through a linkage 38. Motor 36 may in turn be controlled by means of a voltage control circuit 40, also well known in the art, wherein ram 28 may be raised or lowered as a function of the voltage existing between electrode 4 and mold 6 through molten slag 20, pool 18, and ingot 16.

On ram 28 is a connector 42 to which a conductor 44 is connected leading to power source 46. A second conductor 48 connects power source 46 to conductive mold 6 through switch 50. Thus, open the application of power by closing switch 50, a difference of potential is established between electrode 4 and conductive mold 6 which may be closed through slag layer 20, molten pool 18 and ingot 16 by the flow of electrical current. In the case of a multi-electrode furnace previously mentioned, the circuit may be closed either through the mold, or through another electrode.

As was previously mentioned, it is the usual practice in the starting of melting to place a small supply of a starter charge of the alloy to be cast in the form of chips of molten charge in the bottom of mold 6. Electrode 4 is lowered to contact the charge (not shown) and a current flow is established between the electrode 4 and mold 6 through the aforementioned charge. It is then the practice to charge the furnace with a supply of slag either in granular or molten form to provide a layer on the alloy starter charge.

As will be recognized by those familiar with the art this initial current flow through the starter charge and molten slag is in the nature of a direct conduction by the starter charge and slag. By means of conventional resistive heating, the starter charges of metal and slag are raised above their melting temperatures and a molten pool 18 and a molten slag layer 20 is established.

Figure 2:
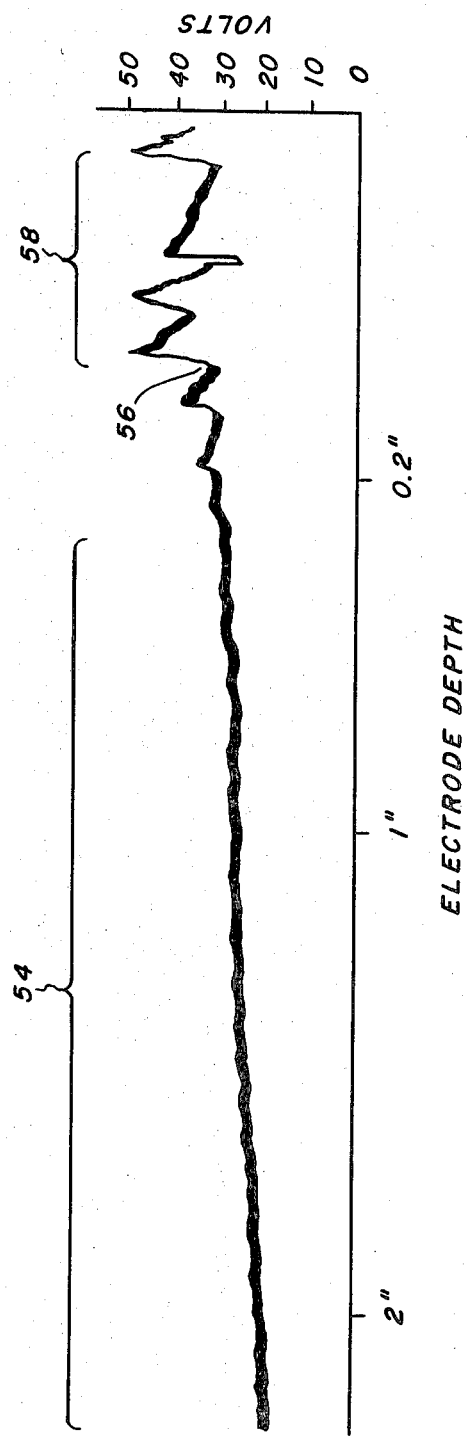
FIG. 2 is a graph of the voltage signal demonstrating the electrical arc for melting the electrode according to my invention.

In the conventional practice of electro-slag melting the electrode 4 would be maintained in a submerged relation with respect to molten slag 20 and current flow would be continued through the slag 20, molten pool 18, and ingot 16 in the nature of a conductive flow. My invention contemplates withdrawing the electrode 4 slightly from the slag 20 and establishing an electric arc 52 between the electrode 4 and the top of the molten slag 20. The withdrawal of the electrode in accordance with my invention accomplishes a coincident increase of the control reference voltage to a value significantly higher than the voltage possible due to direct ohmic conduction through the slag, pool and ingot. Confirming the existence of arc conduction between the withdrawn electrode 4 and the top of the molten slag layer 20 are the agitated condition of the top of slag layer 20, the traditional flashes of light associated with arc conduction and the concurrent "popping" sound associated with arc melting in a conventional electric arc furnace. Further confirmation of the establishment of arc between the electrode and molten pool may be had by referring to FIG. 2 which represents the control voltage in furnace 2. That portion of the curve labeled 54 represents the voltage in the furnace during the initial start-up of the furnace when direct conduction occurs between the electrode and the molten metal 18 through slag 20 resulting in ohmic heating. At point 56 on the voltage curve, it will be noted that there is an abrupt change in the curve as it becomes unstable and that portion 58 represents the point of operation in accordance with my invention illustrating the unstable voltage due to the presence of the arc skipping around the end of electrode 4.

Referring back to FIG. 1, it will be noted when the arc 52 is established, it blows a meniscus 60 in the top of slag 20, supported by the envelope of the ionized gas generated by the arc. Arc 52 may be observed to dance around in the envelope between the electrode 4 and the molten slag 20, further illustrating the dynamic characteristics of arc conduction. It is suggested that this movement of the arc develops a stirring action in the slag maintaining it homogenous and further contributing to the uniform refinement of the droplets 21 of metal as they migrate from the electrode through the slag 20 to the pool 18. The dynamic characteristic of the arc also promotes uniformity of melting the bottom of electrode 4 by virtue of the arc being concentrated at the low points of electrode 4 with respect to slag 20 melting these and tending to even the bottom of electrode 4.

My invention of arc slag melting may be practiced either with straight or reverse polarity direct current (the latter being where the electrode is maintained positive with respect to the crucible to increase the melting rate over that conventionally known). The method may also be practiced with a DC biased alternating current if the bias is sufficient to maintain the arc. It is suggested that the increased melt rate is due in large measure to the increased power input to the melt made possible by the increased control voltage accomplished by the establishment of the arc between the electrode 4 and slag 20. Further, since practice of my invention calls for the establishment of the arc between the electrode and the top of the slag, the hard arc 52 is isolated from pool 28 by slag layer 20 and my process does not suffer from the deep pool and resulting imperfections in ingot 16 that have resulted from attempts to strike a hard arc in a submerged electrode.

In the example disclosed and illustrated, I have accomplished my arc slag melting in a consumable electrode type of furnace having a crucible of a diameter and depth to produce a cast alloy ingot of 17 inches in diameter by 80 inches in length. In casting an exemplary type ingot of 83W alloy, I employ an electrode of 14 inches in diameter of substantially the same chemical analysis. I utilize a slag of substantially the following composition: 40% $CaF_2$; 30% $CaO$; and 30% $Al_2O_3$; which is commercially available. As I initiate the melt, I place several plates of starter material substantially of the chemical analysis of the alloy to be cast into the furnace 2 and lower the electrode 4 into contact with the starter plates establishing a direct conduction. I then add the slag to the furnace in granular form and the ohmic heating of the current melts the starter plates establishing a molten metal pool 18 and slag pool 20. As the slag melts, I add additional powdered slag up to a total charge of approximately 90 pounds making sure that the additional slag becomes totally molten. At this point, I begin to withdraw electrode 4 from the molten pool causing the tip of the electrode 4 to approach the top of slag layer 20. During the portion of ohmic heating the control voltage through the slag to the molten metal is approximately 30 volts. As I approach the top of the slag layer 20, establishing the arc and gas envelope 60, the control voltage is allowed to rapidly rise to approximately 50 volts. Upon establishment of the arc heating of the electrode the current supplied to the melt is approximately 12,000 amps. It is believed that the gas envelope surrounding electrode 4 is approximately one-eighth inch to one-fourth inch in thickness, however it is difficult to measure because of location.

In a melt of type 86 alloy, an 11-inch electrode was melted and cast into a 14-inch ingot. The initial ohmic voltage was approximately 20 volts DC and rose rapidly to approximately 30 volts upon establishment of the arc. Melting current for this example was observed to be approximately 10,000 amps. The practice of melting for the aforementioned alloys utilize a slag layer of approximately 6 inches in thickness.

Conventional slags for electro-slag melting such as that in the disclosed example may be employed depending upon whichever one presents the most advantageous in refining of the particular alloys to be cast. Likewise, as with conventional electro-slag melting, a variety of alloys may be melted and cast and the practice of my invention imposes no known limitations over those known in the art. The alloys referred to in the examples, (types 83W and 86) are Allegheny Ludlum commercial grades of high speed tool steel alloys and are similar to SAE M-7 tool steel. It will be recognized that variations may be made in the physical parameters of the practice of arc slag melting, however remaining within the true spirit of the invention and thus embodied within the scope of the appended claims. I claim:

1. A method of melting metal in a consumable electrode furnace by electro-slag refining whereby a high quality homogeneous ingot may be produced which comprises: disposing an electrode to be melted within a surrounding metal mold; adding slag to said mold to establish a layer of molten slag therein; producing an electrical potential between said electrode and said mold to cause an electrical current to flow through said electrode and slag layer while establishing an electric arc between said electrode and said slag layer; melting said electrode while maintaining said electrode out of contact with said slag layer during the entire melting of the electrode thereby forming droplets of the melted metal which pass through said slag layer and accumulate in a pool of molten metal there-under while said slag covers the entirety of said molten pool during the entire melting of the electrode; and solidifying said pool of molten metal at a predetermined rate to form an ingot.

2. A method according to claim 1 wherein said arc is established by lowering said consumable electrode into said slag layer, flowing an electrical current through said electrode and slag layer, withdrawing said electrode from said slag layer and establishing an electric arc between said electrode and said slag layer while continuing the flow of electrical current through said electrode and said slag layer.

3. A method according to claim 1 wherein said electrical current is straight polarity direct current.

4. A method according to claim 1 wherein said electrical current is reverse polarity direct current.

5. A method according to claim 1 wherein said electric current is direct current superimposed upon alternating current.

6. The method of claim 1 wherein the voltage of said electric arc is in the range of about 30 to 50 volts and the electrical current through said electrode and slag layer is in the range of about 10,000 to 12,000 amperes.

* * * * *